United States Patent [19]

Káser

[11] Patent Number: 5,211,719

[45] Date of Patent: May 18, 1993

[54] CONCENTRATED ACQUEOUS SOLUTIONS OF ANIONIC DISAZO DYES WITH POLYGLYCOL-AMINE

[75] Inventor: Adolf Káser, Bottmingen, Switzerland

[73] Assignee: Ciba-Geigy Corporation, Ardsley, N.Y.

[21] Appl. No.: 766,935

[22] Filed: Sep. 27, 1991

[30] Foreign Application Priority Data

Oct. 4, 1990 [CH] Switzerland ............. 3201/90

[51] Int. Cl.$^5$ ............. C09B 31/72; C09B 31/08; C09B 67/10; C09B 67/36
[52] U.S. Cl. ............. 8/527; 8/602; 8/604; 8/609; 8/681; 8/919
[58] Field of Search ............. 8/527, 604

[56] References Cited

U.S. PATENT DOCUMENTS

| | | | |
|---|---|---|---|
| 4,149,849 | 4/1979 | Koch et al. | 8/574 |
| 4,245,995 | 1/1981 | Husl et al. | 8/574 |
| 4,654,045 | 3/1987 | Rowe | 8/527 |

FOREIGN PATENT DOCUMENTS

| | | |
|---|---|---|
| 1156836 | 7/1969 | United Kingdom . |
| 1311836 | 3/1973 | United Kingdom . |
| 1565180 | 4/1980 | United Kingdom . |

*Primary Examiner*—A. Lionel Clingman
*Attorney, Agent, or Firm*—Marla J. Mathias; Edward McC. Roberts

[57] ABSTRACT

Concentrated aqueous solutions are described comprising specific anionic disazo dyes and polyglycol amines, which are highly suitable as commercial forms.

7 Claims, No Drawings

CONCENTRATED ACQUEOUS SOLUTIONS OF ANIONIC DISAZO DYES WITH POLYGLYCOL-AMINE

The present invention relates to concentrated aqueous solutions of anionic disazo dyes, comprising salts of anionic dyes of the formula

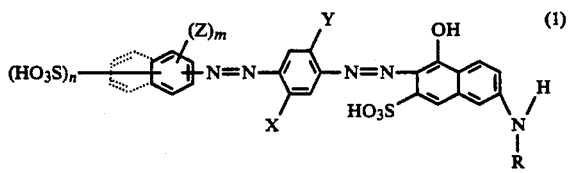

with polyglycol amines of the formula

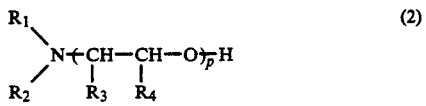

in which X and Y, independently of one another, are each hydrogen, alkyl or alkoxy, R is hydrogen or aryl, Z is alkyl, alkoxy, halogen, hydroxyl or carboxyl, n is 1 or 2, m is 0, 1 or 2, $R_1$ and $R_2$, independently of one another, are each alkyl or the group

$R_3$ and $R_4$, independently of one another, are each hydrogen, methyl or ethyl, p is a number from 2 to 20 and q is a number from 1 to 20, and, if desired, water-soluble organic solubilising agents.

According to the invention, alkyl is generally understood to mean straight-chain or branched alkyl groups. They preferably have 1 to 4 C atoms. They are, for example, methyl, ethyl, n-propyl, i-propyl, n-butyl, i-butyl, sec-butyl or tert-butyl.

Suitable alkoxy radicals are preferably those having 1 to 4 C atoms, for example methoxy, ethoxy, n-propoxy, iso-propoxy, n-butoxy, iso-butoxy, sec-butoxy or tert-butoxy.

Halogen is understood to mean fluorine, bromine, iodine or in particular chlorine.

The aryl radicals are aromatic carbocyclic or heterocyclic radicals. They are, for example, pyridyl, naphthyl or in particular phenyl. These radicals can be substituted, for example by halogen, alkyl, alkoxy or sulfo.

Suitable anionic disazo dyes are preferably those of the formula

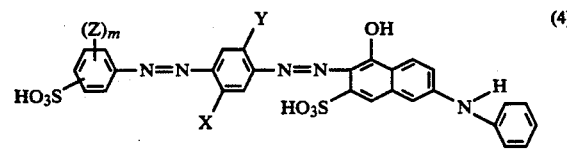

in which Z is methyl, X and Y, independently of one another, are each hydrogen, methyl or methoxy and m is 0, 1 or 2.

Of these, those in which Z is methyl, m is 0, 1 or 2, in particular 0, X is methyl and Y is methoxy are particularly preferred.

Examples of suitable polyglycol amines of the formula (2) are the reaction products of ammonia and alkyl- and hydroxyalkylamines, such as methylamine, ethylamine, dimethylamine, ethanolamine, diethanolamine, triethanolamine, mono-, di- and triisopropanolamine with alkylene oxides, such as ethylene oxide, 1,2-propylene oxide, 1,2-butylene oxide or 2,3-butylene oxide in suitable weight ratios. The reaction takes place at temperatures of about 50°–150° C. Not only the pure alkylene oxides but also mixtures of different alkylene oxides can be used in this reaction.

Examples of compounds of this type are the reaction product of diisopropanolamine with 4 mol of ethylene oxide, the reaction product of triethanolamine with 3 mol of ethylene oxide, the reaction product of triisopropanolamine with 6 mol of ethylene oxide and the reaction product of ammonia with 2 mol of butylene oxide and 4 mol of ethylene oxide.

Particularly preferred polyglycol amines are those of the formula (2) in which $R_1$ and $R_2$ are each a group of the formula (3), in particular reaction products of 1 mol of triethanolamine with 2 to 4, in particular 3, mol of propylene oxide.

These polyglycol amines are known, for example from DE-A 2 061 760, or can be prepared in the manner described there.

Examples of suitable water-soluble organic solubilising agents are urea, formamide, dimethylformamide, water-miscible polyhydric alcohols, such as ethylene glycol, propylene glycol, glycerol, alkanolamine, such as ethanolamine, triethanolamine or else polyglycol amines of the formula (2).

The concentrated solutions according to the invention are in general prepared in such a manner that the free dye acids are stirred with a mixture of water and polyglycol amine of the formula (2) until a homogeneous solution is formed.

The amount of polyglycol amine can vary widely, so that a less or more than stoichiometric amount (relative to the amount required for complete salt formation) can be present. However, it is preferred to use at least the amount necessary for complete salt formation.

The solutions in general comprise:
5–40% by weight of anionic dye (calculated as free acid),
20–90% by weight of water and
5–40% by weight of polyglycol amine.

Preferred concentrated solutions comprise
10–30% by weight of dye,
10–30% by weight of polyglycol amine and
40–80% by weight of water.

Of these, those solutions which contain the dye of the formula (4), in which m is 0, X is methyl and Y is methoxy and in which the sulfo group on the phenyl radical is in the p-position relative to the azo bridge, are particularly preferred.

The concentrated solutions according to the invention are distinguished in particular by a long shelf life and by a low viscosity even at temperatures below room temperature, for example, at 5° C.

Compared with the solution of a similar dye known from DE-A 2 061 760 (Example 4), they have in particular the advantage of a low viscosity, making them readily meterable even at low temperatures.

The concentrated dye solutions according to the invention are used, if desired after dilution with water, in particular for dyeing and printing paper, including thin board and cardboard, it being possible to colour these materials, for example, in the mass by brush- or dip-coating. A liquid formulation of this type can likewise be used for a continuous or batchwise dyeing process for textile materials, in particular cellulose.

The examples which follow illustrate the invention.

EXAMPLE 1

64.7 g of the free acid of the dye of the formula

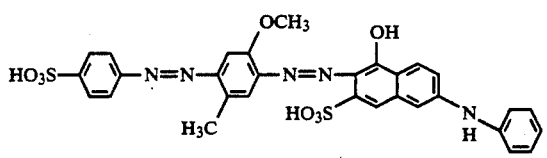

are stirred together with 71.1 g of polyglycol amine, prepared by reaction of 1 equivalent of triethanolamine with 3 equivalents of propylene oxide, in 223 g of water until complete dissolution has taken place. This gives a highly concentrated, stable solution which is still very thin even at 5° C.

EXAMPLE 2

67.5 g of the free acid of the formula

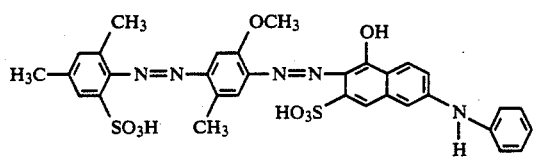

are stirred together with 87 g of the polyglycol amine used in Example 1 in 809 g of water until complete dissolution has taken place. This gives a stable concentrated dye solution.

EXAMPLES 3-15

Stable concentrated solutions of the following dyes can also be prepared in the same manner as described in Examples 1 and 2:

TABLE

| Example | 1st diazo component | Middle component | End component |
|---|---|---|---|
| 3 | 2,4-Dimethylaniline-6-sulfonic acid | 2,5-Dimethylaniline | 6-Anilino-1-naphthol-3-sulfonic acid |
| 4 | 4-Methylaniline-2-sulfonic acid | 2,5-Dimethylaniline | 6-Anilino-1-naphthol-3-sulfonic acid |
| 5 | 2-Aminonaphthaline-4,8-disulfonic acid | 2,5-Dimethylaniline | 6-Anilino-1-naphthol-3-sulfonic acid |
| 6 | Aniline-3-Sulfonic acid | 2-Amino-4-methyl-anisole | 6-Anilino-1-naphthol-3-sulfonic acid |
| 7 | 4-Methylaniline-2-sulfonic acid | 2-Amino-4-methyl-anisole | 6-Anilino-1-naphthol-3-sulfonic acid |
| 8 | 4-Chloraniline-3-sulfonic acid | 2-Amino-4-methyl-anisole | 6-Anilino-1-naphthol-3-sulfonic acid |
| 9 | 1-Naphthylamine-2-sulfonic acid | 2-Amino-4-methyl-anisole | 6-Anilino-1-naphthol-3-sulfonic acid |
| 10 | 2-Naphthylamine-4,8-disulfonic acid | 2-Amino-4-methyl-anisole | 6-Anilino-1-naphthol-3-sulfonic acid |
| 11 | Aniline-3-sulfonic acid | 2-Amino-anisole | 6-Anilino-1-naphthol-3-sulfonic acid |
| 12 | Aniline-4-sulfonic acid | 2,5-Dimethoxy-aniline | 6-Anilino-1-naphthol-3-sulfonic acid |
| 13 | 4-Methoxyaniline-2-sulfonic acid | 3-Methoxyaniline | 6-Anilino-1-naphthol-3-sulfonic acid |
| 14 | Aniline-4-sulfonic acid | Aniline | 6-Amino-1-naphthol-3-sulfonic acid |
| 15 | 4-Chloraniline-3-sulfonic acid | 2-Amino-4-methyl-anisole | 6-Amino-1-naphthol-3-sulfonic acid |

What is claimed is:

1. A concentrated aqueous solution of anionic disazo dyes, comprising salts of anionic dyes of the formula

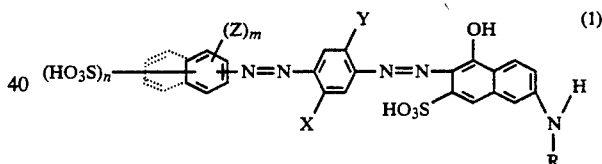

with polyglycol amines of the formula

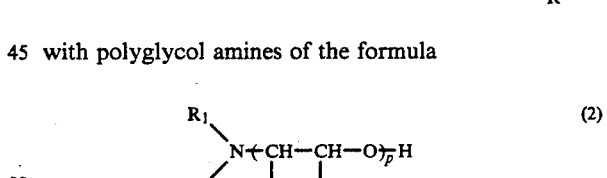

in which X and Y, independently of one another, are each hydrogen, alkyl or alkoxy, R is hydrogen or aryl, Z is alkyl, alkoxy, halogen, hydroxyl or carboxyl, n is 1 or 2, m is 0, 1 or 2, $R_1$ and $R_2$, independently of one another, are each alkyl or the group

$R_3$ and $R_4$, independently of one another, are each hydrogen, methyl or ethyl, p is a number from 2 to 20 and q is a number from 1 to 20, and, if desired, water-soluble organic solubilising agents.

2. A concentrated aqueous solution according to claim 1, which contains a dye of the formula

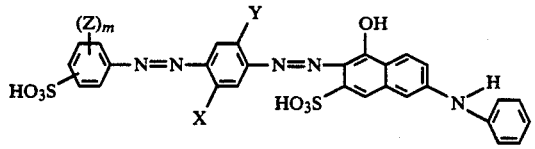

in which Z is methyl, X and Y, independently of one another, are each hydrogen, methyl or methoxy and m is 0, 1 or 2.

3. A concentrated aqueous solution according to claim 2, which contains a dye of the formula (4), in which Z is methyl, m is 0, 1 or 2, in particular 0, X is methyl and Y is methoxy.

4. A concentrated aqueous solution according to claim 1, which contains a polyglycol amine of the formula (2), in which $R_1$ and $R_2$ are each a group of the formula (3).

5. A concentrated aqueous solution according to claim 1, which comprises 5 to 40% by weight of the dye of the formula (1), 5–40% by weight of polyglycol amine of the formula (2) and 20 to 90% by weight of water.

6. A concentrated aqueous solution according to claim 5, which comprises 10 to 30% by weight of the dye of the formula (1), 10 to 30% by weight of the polyglycol amine of the formula (2) and 40 to 80% by weight of water.

7. A concentrated aqueous solution according to claim 6, which contains the dye of the formula (4), in which m is 0, X is methyl and Y is methoxy and in which the sulfo group on the phenyl radical is in the p-position relative to the azo bridge.

* * * * *